(12) United States Patent
Komori et al.

(10) Patent No.: US 8,905,645 B2
(45) Date of Patent: Dec. 9, 2014

(54) WHEEL BEARING APPARATUS

(71) Applicant: NTN Corporation, Osaka (JP)

(72) Inventors: Kazuo Komori, Iwata (JP); Yasushi Shibata, Iwata (JP)

(73) Assignee: NTN Corporation, Osaka-shi (JP)

( * ) Notice: Subject to any disclaimer, the term of this patent is extended or adjusted under 35 U.S.C. 154(b) by 3 days.

(21) Appl. No.: 13/622,539

(22) Filed: Sep. 19, 2012

(65) Prior Publication Data

US 2013/0051720 A1 Feb. 28, 2013

Related U.S. Application Data

(63) Continuation of application No. PCT/JP2011/056569, filed on Mar. 18, 2011.

(30) Foreign Application Priority Data

Mar. 19, 2010 (JP) ................................ 2010-063439

(51) Int. Cl.

| F16C 33/76 | (2006.01) |
|---|---|
| F16C 33/54 | (2006.01) |
| F16C 19/54 | (2006.01) |
| F16C 33/58 | (2006.01) |
| F16C 33/78 | (2006.01) |
| F16C 19/18 | (2006.01) |

(52) U.S. Cl.
CPC ............. *F16C 33/58* (2013.01); *F16C 2240/40* (2013.01); *F16C 33/7879* (2013.01); *F16C 2326/02* (2013.01); *F16C 19/186* (2013.01)
USPC ............................ 384/544; 384/486; 384/504

(58) Field of Classification Search
USPC ......... 384/477, 484–486, 543–544, 589, 502, 384/504
See application file for complete search history.

(56) References Cited

U.S. PATENT DOCUMENTS

| 4,798,560 A | * | 1/1989 | Farrell .......................... 384/544 |
| 5,051,004 A | | 9/1991 | Takeuchi et al. |
| 5,240,333 A | * | 8/1993 | Hassiotis et al. .............. 384/448 |
| 5,490,732 A | * | 2/1996 | Hofmann et al. ............. 384/543 |
| 5,764,049 A | * | 6/1998 | Hofmann et al. ............. 384/448 |

(Continued)

FOREIGN PATENT DOCUMENTS

| CN | 101278134 | 10/2008 |
| DE | 11 2007 003 1 | 11/2009 |

(Continued)

*Primary Examiner* — Marcus Charles
(74) *Attorney, Agent, or Firm* — Harness, Dickey & Pierce, P.L.C.

(57) ABSTRACT

A wheel bearing apparatus has an outer member, an inner member, and double row rolling elements are contained between the outer raceway surfaces. Seals are mounted in openings formed between the outer member and the inner member. A shoulder height H of the inner raceway surface of the inner ring is set with a range of 0.4-0.8 times a diameter "d" of the ball (H/d=0.4-0.8). A shoulder height $\delta$ of a smaller diameter portion formed on the outermost circumference of the inner ring is set to a value $\delta/d \geq 0.35$. A corner, formed by the tapered surface and the inner raceway surface, is rounded to have a circular arc cross-section. A shoulder height H1 of the inner raceway surface from its bottom to the corner is set within a range of 0.40-0.50 times a diameter of the ball (d) (H1/d=0.40-0.50).

10 Claims, 6 Drawing Sheets

(56) References Cited

U.S. PATENT DOCUMENTS

| | | | |
|---|---|---|---|
| 5,822,859 A * | 10/1998 | Kessen et al. | 29/898.061 |
| 6,702,472 B2 * | 3/2004 | Sera et al. | 384/544 |
| 7,980,766 B2 * | 7/2011 | Tsuzaki | 384/537 |
| 2002/0051597 A1 * | 5/2002 | Sera et al. | 384/544 |
| 2004/0234182 A1 * | 11/2004 | Tajima et al. | 384/544 |
| 2005/0105840 A1 * | 5/2005 | Muranaka et al. | 384/544 |
| 2007/0076994 A1 * | 4/2007 | Norimatsu et al. | 384/486 |
| 2007/0081751 A1 * | 4/2007 | Norimatsu et al. | 384/486 |
| 2008/0199121 A1 | 8/2008 | Komori et al. | |
| 2009/0263063 A1 * | 10/2009 | Komori | 384/478 |
| 2010/0124389 A1 * | 5/2010 | Norimatsu et al. | 384/448 |

FOREIGN PATENT DOCUMENTS

| | | | |
|---|---|---|---|
| EP | 1944518 B | * | 2/2007 |
| EP | 1 944 518 | | 7/2008 |
| JP | 03-096717 | | 4/1991 |
| JP | 200111566 A | * | 4/2000 |
| JP | 2001-323942 | | 11/2001 |
| JP | 2003-042175 | | 2/2003 |
| JP | 2003042175 A | * | 2/2003 |
| JP | 2004-052784 | | 2/2004 |
| JP | 2005140188 A | * | 6/2005 |
| JP | 2005325903 A | * | 11/2005 |
| JP | 2006183712 A | * | 7/2006 |
| JP | 2007-100715 | | 4/2007 |
| JP | 2007100715 A | * | 4/2007 |
| JP | 2008-202748 | | 9/2008 |
| JP | 2008202748 A | * | 9/2008 |
| JP | 2009149141 A | * | 7/2009 |
| JP | 2009197883 A | * | 9/2009 |
| WO | WO 2007/037477 | | 4/2007 |
| WO | WO2007/037477 | | 4/2007 |

* cited by examiner

H/d=0.40~0.80
δ/d≧0.35

H/d=0.40～0.80
δ/d≧0.35

Fig 5
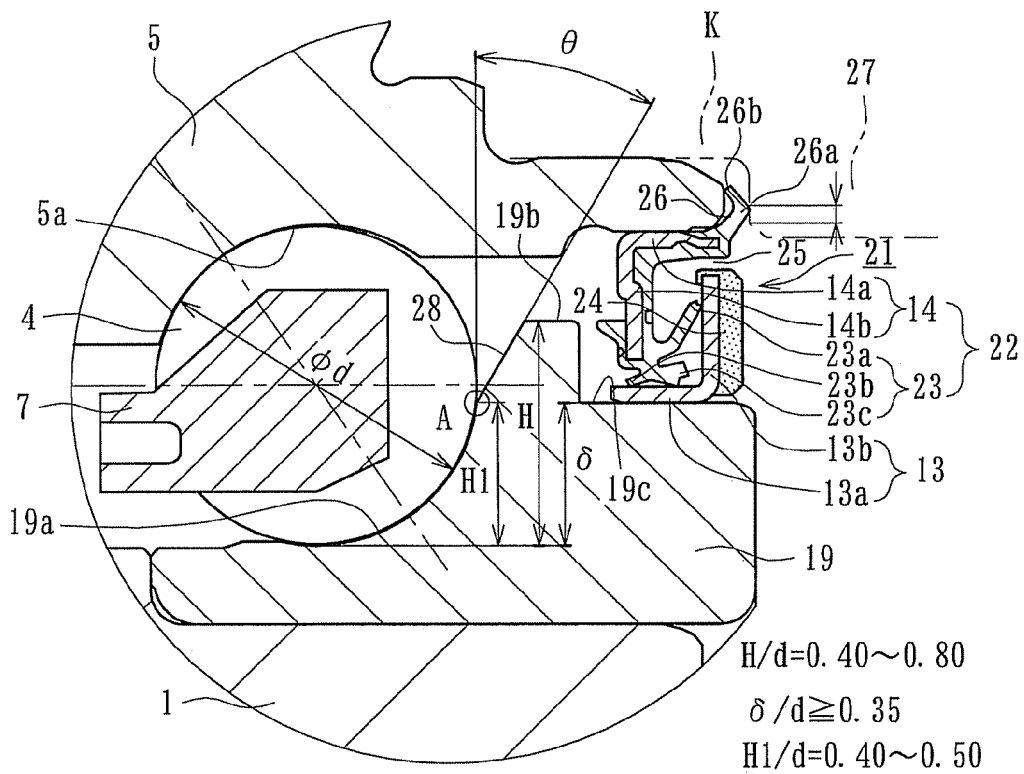
H/d=0.40~0.80
δ/d≧0.35
H1/d=0.40~0.50
[Fig 6]
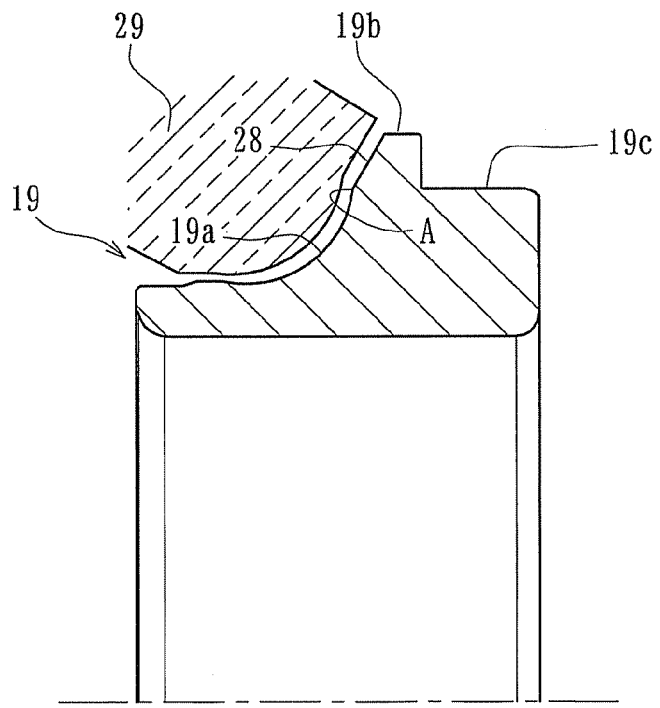

WHEEL BEARING APPARATUS

CROSS-REFERENCE TO RELATED APPLICATIONS

This application is a continuation of International Application No. PCT/JP2011/056569, filed Mar. 18, 2011, which claims priority to Japanese Application No. 2010-063439, filed Mar. 19, 2010. The disclosures of the above applications are incorporating herein by reference.

FIELD

The present disclosure relates to a wheel bearing apparatus that freely rotationally supports a wheel of a vehicle, such as an automobile and, more particularly, to a wheel bearing apparatus that prevents the shoulder overriding of the contact ellipse of ball and thus the generation of edge loads as well as assures the cross-section height of the seal to improve the sealability.

BACKGROUND

Wheel bearing apparatus that freely rotationally supports a wheel of a vehicle includes a wheel hub for mounting a wheel via a rolling bearing for a driving wheel and a driven wheel. Due to structural constraints, the inner ring rotation type is used for the wheel bearing apparatus for a driving wheel and both the inner ring rotation type and the outer ring rotation type are used for the wheel bearing apparatus for a driven wheel. Double row angular contact ball bearings, with low rotational torque characteristics, are popularly adopted in the wheel bearing apparatus in the point of views of having a desirable bearing rigidity. Also, the ball bearings exhibit high durability against desirable bearing rigidity. Also, the ball bearings exhibit high durability against misalignment and improved fuel consumption. In the double row angular contact ball bearing, a plurality of balls are interposed between a secured ring and a rotational ring and contact them while applying a predetermined contact angle onto the balls.

The wheel bearing apparatus are classified broadly into the first, second, third or fourth generation type. In the first generation type, a wheel bearing includes a double row angular contact ball bearing etc. fit between a wheel hub and knuckle forming part of a suspension apparatus. The second generation type includes a body mounting flange or a wheel mounting flange directly formed on the outer circumference of an outer member (outer ring). The third generation type includes one inner raceway surface directly formed on the outer circumference of a wheel hub. The fourth generation type includes the inner raceway surface directly formed on the outer circumferences, respectively, of the wheel hub and the outer joint member of the constant velocity universal joint.

In recent years, there have been strong desires to improve "NVH", i.e. "Noise", "Vibration" and "Harshness" to say nothing of improvement of the durability and reduction of manufacturing cost. As shown in FIG. 7, a prior art wheel bearing 50, used in the wheel bearing apparatus, is formed by a double row angular contact ball bearing. It includes an outer member 51 formed on its inner circumference with double row outer raceway surfaces 51a, 51a each having a circular arc cross-section. A pair of inner ring 52, 52 is each formed on its outer circumference with an inner raceway surface 52a having a circular arc cross section opposite to one of the double row outer raceway surfaces 51a, 51a. Double row balls 53, 53 are contained between the outer and inner raceway surfaces. The bearing portion of each row has a contact anglea. A seal 54 is mounted in the annular openings formed between the outer member 51 and the inner ring 52. The seal 54 prevents leakage of lubricating grease sealed within the bearing and the entry of rain water or dust into the bearing from the outside.

In higher shoulder edges 55, 56, in cross-sections of the outer and inner raceway surfaces 51a, 52a, they are formed with auxiliary raceway surfaces 55a, 56a, respectively, smoothly continuous to curved surfaces "a", "b" of circular arc cross-section. Each of the auxiliary raceway surfaces 55a, 56a has a cross-section formed by a concave line or straight line having a curvature smaller than that of the curved surfaces "a", "b". Chamfered portions 55b, 56b, each having a circular arc cross-section, are continuous with the auxiliary raceway surfaces 55a, 56a.

In such a wheel bearing apparatus, since they are formed with the auxiliary raceway surfaces 55a, 56a, the contact ellipse of the ball 53 would be "pushed out" from each raceway surface 51a, 52a to the auxiliary raceway surface 55a, 56a. However, since the auxiliary raceway surfaces 55a, 56a are continuous with the curved surfaces "a", "b", forming the cross-section of the raceway surfaces 51a, 52a and have straight cross-sections, the generation of the edge load (excessive stress) will be prevented even though the contact ellipse would be pushed out.

In addition, each of the auxiliary raceway surfaces 55a, 56a has a straight cross-section. Thus, it is possible to set the inclination of the auxiliary raceway surfaces 55a, 56a larger as compared with an inclination formed by an extension of the circular arc curves "a", "b" of the raceway surfaces 51a, 52a even though it is set that the inner diameter of the outer member 51 is small or the outer diameter of the inner ring 52 is large. Accordingly, a condition where the auxiliary raceway surfaces 55a, 56a have to be ground using a side surface of a grinding wheel can be avoided. Thus, time for grinding can be reduced.

In addition, the raceway surfaces 51a, 52a, respectively, have the chamfered surfaces 55b, 56b of circular arc cross-section continuous with the edges of the auxiliary raceway surfaces 55a, 56a. The edge load of the contact ellipse can be further reduced (see e.g. Japanese Laid-open Patent Publication No. 52784/2004).

In the described wheel bearing apparatus, the contact ellipse of the ball 53 would override the shoulder portion of the raceway surface if an excessive load is input onto the wheel bearing from a wheel. Indentations generated on the shoulder would cause abnormal noise when a vehicle runs to curve. For solving the problem of indentations caused in the shoulder of raceway surface, it is necessary to increase the shoulder of the raceway surface. However, increasing the height of raceway surface causes problems of increasing the weight of wheel bearing and a reduction of its workability and finally it increases of manufacturing cost. On the other hand, sufficient sealability will not be assured due to a reduction of the cross-section height of the seal 54 by an amount equal to the increase of the shoulder height of the inner ring 52 if it would be increased. In the present specification, the term "shoulder overriding" means a phenomenon where the contact ellipse formed in a contact portion between the ball 53 and the outer raceway surface 51a is pushed out from the corner between the inner diameter of the outer member 51 and the outer raceway surface 51a. This generates the edge load when a large moment load is applied to the wheel bearing.

SUMMARY

It is, therefore, an object of the present disclosure to provide a wheel bearing apparatus that prevents the generation of an edge load of the contact ellipse of the ball and improves the sealability of the wheel bearing while keeping the cross-section height of the seal.

To achieve an object of the present disclosure, a wheel bearing apparatus comprises an outer member integrally formed on its inner circumference, with double row outer raceway surfaces. Each raceway surface has a circular arc cross-section. An inner member includes a wheel hub and at least one inner ring. The wheel hub has, at its one end, an integrally formed wheel mounting flange. The wheel hub has an axially extending cylindrical portion. The inner ring is fit onto the cylindrical portion. The inner member is formed, on its outer circumference, with the inner raceway surfaces. Each inner raceway surface has a circular arc cross-section adapted to be arranged opposite to the double row outer raceway surfaces. Double row rolling elements are freely rollably contained between the outer raceway surfaces and the inner raceway surfaces, via cages. Seals are mounted, at openings at both ends, in an annular space formed between the outer member and the inner member. A shoulder height H of the inner raceway surface of the inner ring is set to a range within 0.4-0.8 times a diameter "d" of the ball (H/d=0.4-0.8). The shoulder height δ of a smaller diameter portion formed on the outermost circumference of the inner ring is set to a value δ/d≥0.35.

In the wheel bearing apparatus formed with double row angular contact ball bearings used for the first through third generation type wheel bearing apparatus, a shoulder height H of the inner ring is set to a range within 0.4-0.8 times a diameter "d" of the ball (H/d=0.4-0.8). A shoulder height δ of a smaller diameter portion, formed on the outermost circumference of the inner ring, is set to a value δ/d≥0.35. Thus, it is possible to provide a wheel bearing apparatus that prevents the generation of the edge load of the contact ellipse of the ball and improve the sealability of the wheel bearing while assuring the cross-section height of the seal.

A tapered surface of a predetermined inclined angle θ is formed over a region from the outermost circumference of the inner ring to the inner raceway surface. This improves the resistance against the generation of indentations on the shoulder, to prevent the shoulder overriding of the contact ellipse of the ball and the generation of the edge load. Thus, this improves the noise level and life of the wheel bearing.

A corner formed by the tapered surface and the inner raceway surface is rounded to have a circular arc cross-section. It is smoothly and continuously ground by a formed grinding wheel simultaneously with grinding of the inner raceway surface. This makes it possible to prevent the generation of the edge load. Thus, this improves the noise level and the life of the wheel bearing.

A shoulder height H1 of the inner raceway surface, from its bottom to the corner, is set to a range within 0.40-0.50 times a diameter "d" of the ball (H1/d=0.40-0.50). This enables the inner raceway surface to resist against the indentations even though a large moment load is applied.

The inclined angle θ of the tapered surface 28 is set at 45° or less. This prevents the shoulder overriding of the contact ellipse of the ball in order to effectively prevent the generation of the edge load.

The seal comprises an annular sealing plate with a substantially L-shaped cross-section. A slinger includes a cylindrical portion press-fit onto a smaller diameter portion of the inner ring. A standing-up portion extends radially outward from the cylindrical portion. The slinger is press-fit onto the smaller diameter portion of the inner ring. The sealing plate is formed as a pack seal. It includes a metal core press-fit into the inner circumference of the end of the outer member. A sealing member is integrally adhered to the metal core via vulcanized adhesion. The sealing member is adapted to be in sliding contact with the slinger. This improves the positioning accuracy of the seal.

The sealing member includes a side lip inclined radially outward. The side lip is adapted to be in sliding contact with the standing-up portion of the slinger, via a predetermined axial interference. A grease lip and an intermediate lip bifurcate each other and are adapted to be in sliding contact with the cylindrical portion of the slinger, via a predetermined radial interference.

The sealing member includes a pair of side lips inclined radially outward. The side lips are adapted to be in sliding-contact with the standing-up portion of the slinger, via a predetermined axial interference. A grease lip extends toward the inside of the wheel bearing. The grease lip is adapted to be in sliding-contact with the cylindrical portion of the slinger, via a predetermined radial interference.

An outer circumferential lip extends radially outward. The outer circumferential lip has a substantially L-shaped cross-section and is formed on the outer circumference of the sealing member. It is arranged to fit into a gap between the outer member and a flanged portion of a knuckle. The diameter of a vertex of the circumferential lip is set to a predetermined value so that the vertex abuts the flanged portion of the knuckle via a predetermined amount of engagement. This prevents the outer circumferential lip from being pushed out after assembly of the knuckle. Thus, this assures the sealability between the outer member and the knuckle in order to prevent the entry of muddy water into the wheel bearing and the generation of rust.

An inner raceway surface is formed on the outer circumference of the wheel hub. The inner raceway surface has a circular arc cross-section and is arranged opposite to one of the double row outer raceway surface. A shoulder height of the inner raceway surface is set to a range within 0.40-0.50 times the diameter "d" of the ball. This enables the inner raceway surface to resist against indentations even though a large moment load is applied.

The wheel bearing apparatus comprises an outer member integrally formed with double row outer raceway surfaces on its inner circumference. Each outer raceway surface has a circular arc cross-section. An inner member includes a wheel hub and at least one inner ring. The wheel hub has, at its one end, an integrally formed wheel mounting flange on its outer circumference. An axially cylindrical portion extends from the mounting flange. The inner ring is fit onto the cylindrical portion. The inner member is formed, on its outer circumference, with the inner raceway surfaces. Each inner raceway surface has a circular arc cross-section and is adapted to be arranged opposite to the double row outer raceway surfaces. Double row rolling elements are freely rollably contained between the outer raceway surfaces and the inner raceway surfaces, via cages. Seals are mounted in openings at both ends of an annular space formed between the outer member and the inner member. A shoulder height H of the inner raceway surface of the inner ring is set to a range within 0.4-0.8 times a diameter "d" of the ball (H/d=0.4-0.8). A shoulder height δ of a smaller diameter portion formed on the outermost circumference of the inner ring is set to a value δ/d≥0.35. This arrangement provides a wheel bearing apparatus that prevents the generation of the edge load of the contact ellipse of the ball and improves the sealability of the wheel bearing while assuring the cross-section height of the seal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a partially enlarged view of the wheel bearing apparatus of FIG. 4;

FIG. 6 is an explanatory view of a grinding method of the inner ring of FIG. 4.

DETAILED DESCRIPTION

A preferable mode for carrying out the present disclosure is a wheel bearing apparatus including an outer member formed with a body mounting flange on its outer circumference. The flange is to be mounted on a knuckle. The outer member inner circumference has double row outer raceway surfaces. Each outer raceway surface has a circular arc cross-section. An inner member includes a wheel hub and an inner ring. The wheel hub has, at its one end, an integrally formed wheel mounting flange. The wheel hub outer circumference has an inner raceway surface with a circular arc cross-section opposing one of the double row outer raceway surfaces. An axially cylindrical portion extends from the inner raceway surface. The inner ring is fit onto the cylindrical portion. The inner ring outer circumference has an inner raceway surface with a circular arc cross-section opposing the other of the double row outer raceway surfaces. Double row rolling elements are freely rollably contained between the outer raceway surfaces and the inner raceway surfaces, via cages. Seals are mounted in openings at both ends of an annular space formed between the outer member and the inner member. A shoulder height H of the inner raceway surface of the inner ring is set to a range within 0.4-0.8 times a diameter "d" of the ball (H/d=0.4-0.8). A shoulder height δ of a smaller diameter portion, formed on the outermost circumference of the inner ring, is set to a value δ/d≥0.35. A tapered surface, of a predetermined inclined angle, is formed over a region from the outermost circumference of the inner ring to the inner raceway surface. A corner formed by the tapered surface and the inner raceway surface is rounded to have a circular arc cross-section. A shoulder height H1 of the inner raceway surface from its bottom to the corner is set within a range of 0.40-0.50 times a diameter "d" of the ball (H1/d=0.40-0.50).

Preferable embodiments of the present disclosure will be hereinafter described with reference to the drawings.

Figure 1:
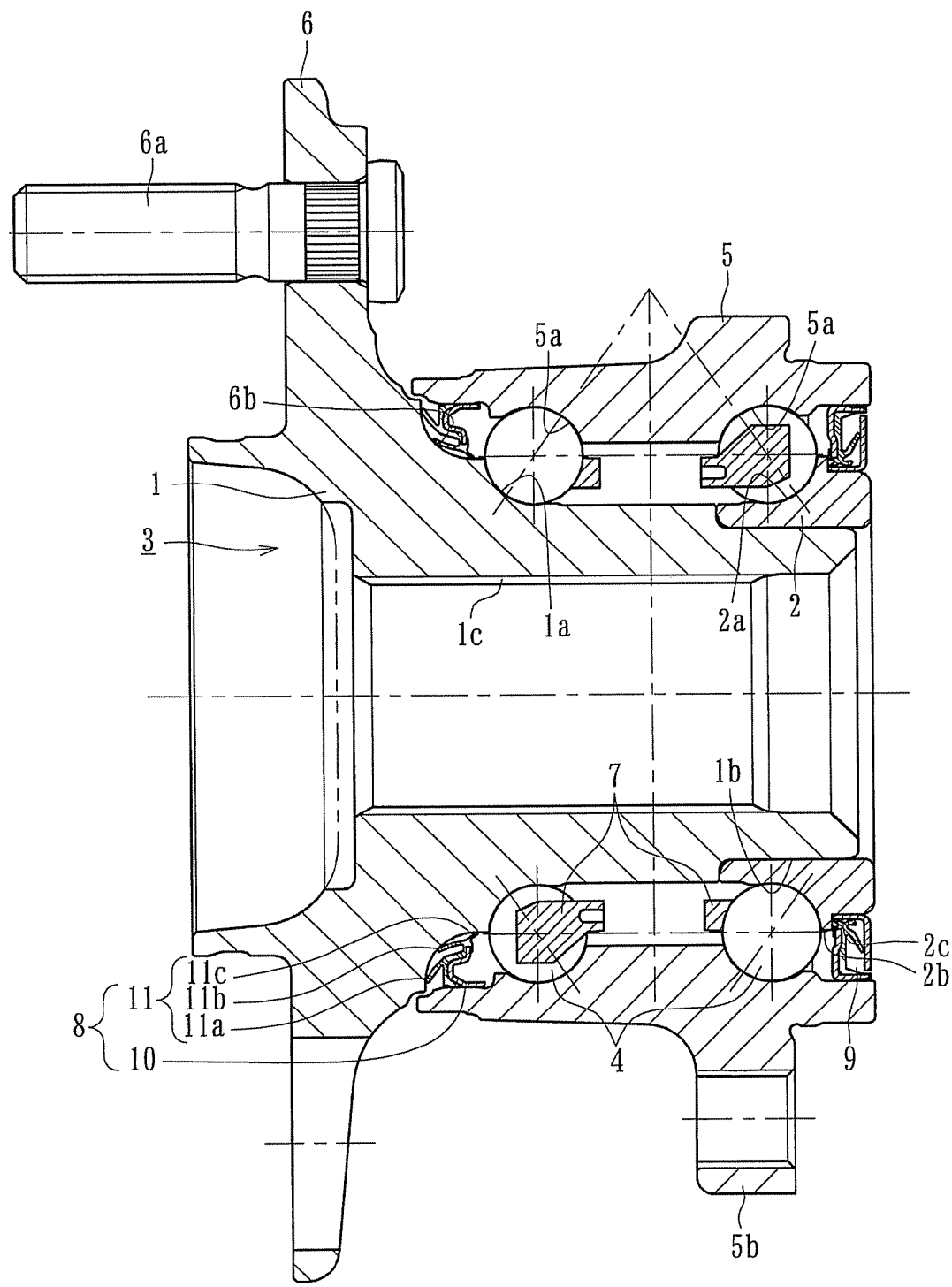
FIG. 1 is a longitudinal section view of a first embodiment of a wheel bearing apparatus.
Figure 2:
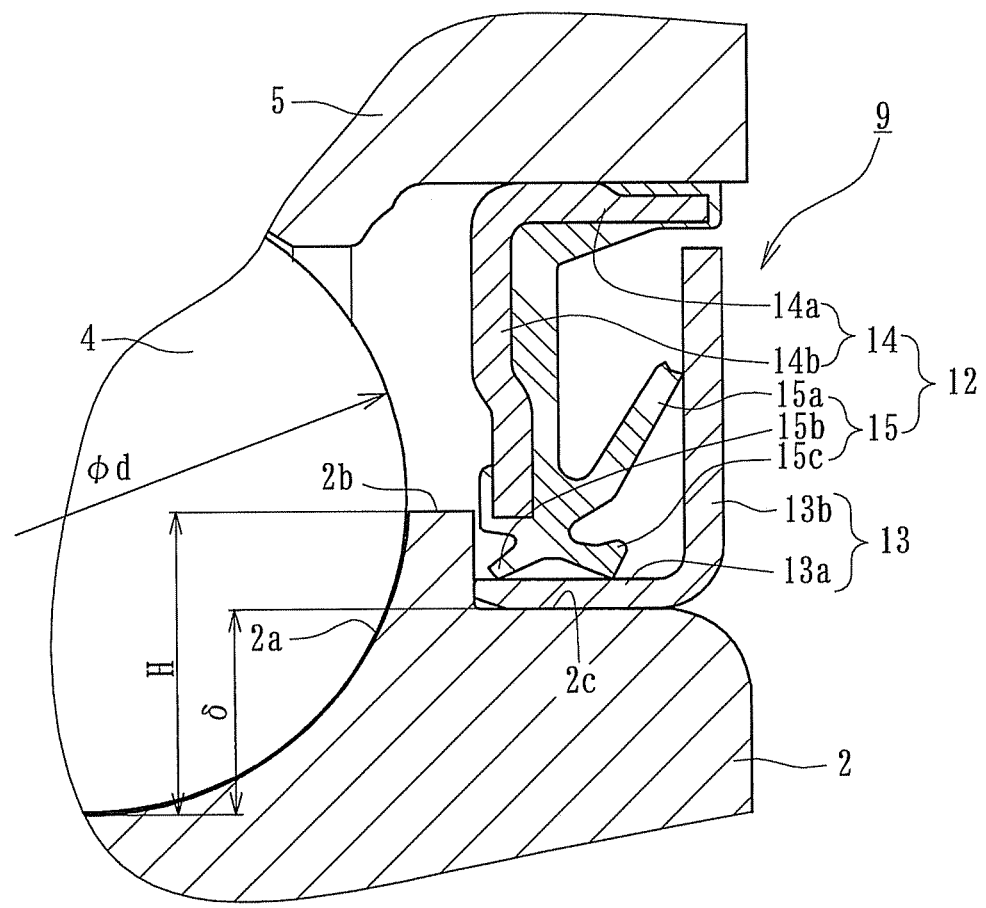
FIG. 2 is a partially enlarged view of the wheel bearing apparatus of FIG. 1.
Figure 3:
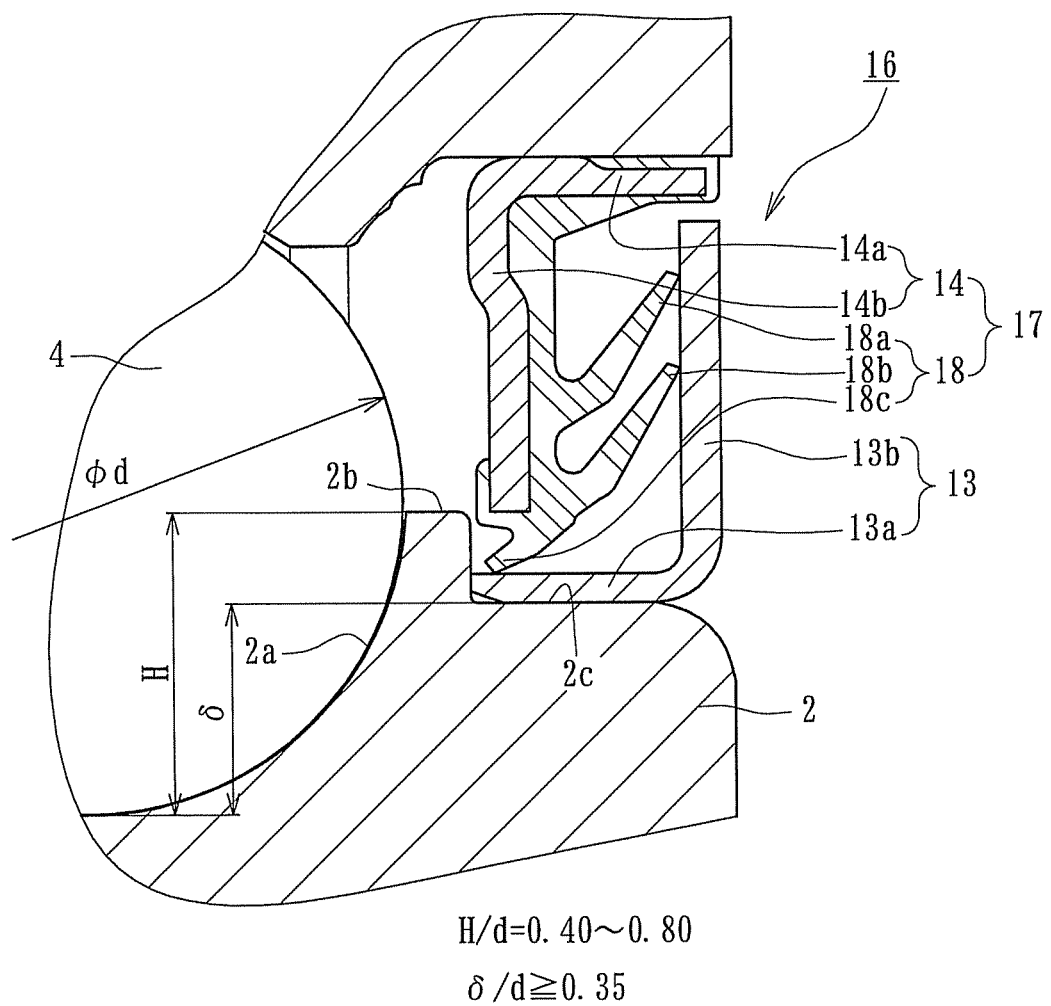
FIG. 3 is a partially enlarged view of a modification of the wheel bearing apparatus of FIG. 2.

FIG. 1 is a longitudinal section view of a first embodiment of the wheel bearing apparatus. FIG. 2 is a partially enlarged view of the wheel bearing apparatus of FIG. 1. FIG. 3 is a partially enlarged view of a modification of the wheel bearing apparatus of FIG. 2. In the description below, an outer side of the wheel bearing apparatus, when it is mounted on a vehicle, is referred to as the "outer-side" (the left side in drawings), and an inner side is referred to as the "inner-side" (the right side in drawings).

The illustrated wheel bearing apparatus is a so-called third generation type used for a driving wheel. It mainly includes an inner member 3 with wheel hub 1 and an inner ring 2 press fit onto the wheel hub 1. An outer member 5 is fit onto the inner member 3 via double row balls 4, 4.

The wheel hub 1 has at its outer-side end a wheel mounting flange 6 for mounting a wheel (not shown). The wheel hub outer circumference has one (outer-side) inner raceway surface 1a. A cylindrical portion 1b axially extends from the inner raceway surface 1a. The wheel hub inner circumference has a serration (or spline) 1c for torque transmission. The inner ring 2 is formed, on its outer circumference, with the other (inner-side) inner raceway surface 2a with a circular arc cross-section. The inner ring 2 is press-fit onto the cylindrical portion 1b of the wheel hub via a predetermined interference. Hub bolts 6a, for fastening a wheel and a brake rotor (not shown), are equidistantly arranged along the periphery of the wheel mounting flange 6.

The wheel hub 1 is made of medium/high carbon steel including carbon of 0.40-0.80% by weight such as S53C. It is hardened by high frequency induction hardening so that a region from an inner-side base of the wheel mounting flange 6 to the cylindrical portion 1b has a surface hardness of 58-64 HRC. This makes it possible to apply a sufficient mechanical strength resisting against a rotary bending load applied to the wheel mounting flange 6. This improves the anti-fretting property of the cylindrical portion 1b onto which the inner ring 2 is press-fit and the durability of the wheel hub 1. The inner ring 2 and the balls 4 are formed from high carbon chrome steel such as SUJ2. They are hardened to their cores by dip hardening to have a hardness of 58-64 HRC.

The outer member 5 is integrally formed on its outer circumference, with a body mounting flange 5b. The body mounting flange is to be mounted on the knuckle (not shown). The outer member inner circumference includes double row outer raceway surfaces 5a, 5a with a circular arc cross-section. The outer raceway surfaces 5a, 5a oppose the inner raceway surfaces 1a, 2a of the inner member 3. Similarly to the wheel hub 1, the outer member 5 is formed from medium/high carbon steel including carbon of 0.40-0.80% by weight such as S53C. At least the double row outer raceway surfaces 5a, 5a are hardened by high frequency induction quenching to have a surface hardness of 58-64 HRC. Double row balls 4, 4 are contained between the raceway surfaces of the outer and inner members 5, 3 and rollably held by cages 7. Seals 8, 9 are mounted in end openings or annular spaces between the outer member 5 and the inner member 3. The seals 8, 9 prevent leakage of grease contained in the bearing and the entry of rain water and dust into the bearing.

The outer-side seal 8 is formed as an integral type seal with a metal core 10 press-fit into the inner circumference of the outer-side end of the outer member 5. A sealing member 11, formed of synthetic resin such as NBR (acrylonitrile-butadiene rubber), is integrally adhered to the metal core 10 via vulcanized adhesion.

The metal core 10 is press-formed from preservative steel sheet such as austenitic stainless steel sheet (JIS SUS 304 etc.) or preserved cold rolled sheet (JIS SPCC etc.). It has a generally annular configuration of substantially "C"-shaped cross-section. The sealing member 11 includes a pair of side lips 11a, 11b, inclined radially outward, and a radial lip 11c, inclined toward the inside of the bearing. The pair of side lips 11a, 11b is adapted to be in sliding contact with a base 6b of the wheel mounting flange 6 of circular arc cross-section, via a predetermined axial interference. The radial lip 11c is adapted to be in sliding contact with the outer circumference of the base 6b, with a predetermined radial interference. There are examples of materials of the sealing member 11 other than NBR, e.g. HNBR (hydrogenation acrylonitrile-butadiene rubber), EPDM (ethylene propylene rubber), ACM (poly-acrylic rubber) superior in heat resistance and chemical resistance, FKM (fluororubber) or silicone rubber.

The inner-side seal 9 is formed as a so-called pack seal. It includes an annular sealing plate 12, of a substantially L-shaped cross section, and a slinger 13, as shown in an enlarged view of FIG. 2. The sealing plate 12 includes a metal core 14 press-fit into the inner circumference of the inner-side end of the outer member 5. A sealing member 15 is integrally adhered to the metal core 14.

The metal core 14 is press-formed from preservative steel sheet such as austenitic stainless steel sheet (JIS SUS 304 etc.) or preserved cold rolled sheet (JIS SPCC etc.). It has a generally annular configuration of substantially "L"-shaped cross-section. It has a cylindrical fitting portion 14a press-fit into the inner circumference of the inner-side end of the outer member 5. A radially inner portion 14b is bent and extends radially inward from the fitting portion 14a. The sealing member 15 is formed of synthetic rubber, such as NBR. A side lip 15a is inclined radially outward. A grease lip 15b and an intermediate lip 15c are formed as a bifurcated configuration.

The slinger 13 includes a cylindrical portion 13a press-fit onto the outer diameter of the inner ring 2. A standing-up portion 13b extends radially outward from the cylindrical portion 13a. The side lip 15a of the sealing member 15 is adapted to be in sliding contact with the standing-up portion 13b of the slinger 13, via a predetermined axial interference. The grease lip 15b and the intermediate lip 15c are adapted to be in sliding contact with the cylindrical portion 13a of the slinger 13, via a predetermined radial interference.

According to the present disclosure, the shoulder height H of the inner raceway surface 2a of the inner ring 2 is set within a range of 0.4-0.8 times a diameter "d" of the ball 4 (H/d=0.4-0.8). In this specification, the term "shoulder height H" means a height from the bottom of the inner raceway surface 2a to the outermost circumference 2b of the inner ring 2. According to the shoulder overriding test performed by the applicant under a condition of 1.5 G equivalent moment load, it can be found that the depth of indentation in the shoulder of the raceway surface is reduced as shown in Table 1. Thus, the generation of edge load of the contact ellipse of the ball 4 can be suppressed and the durability of the wheel bearing can be improved.

TABLE 1

| | 1.5 G equivalent moment load | |
|---|---|---|
| | Shoulder height (H/d) | Depth of shoulder indentation |
| Comparative example | 0.38 | 1.0-1.8 μm |
| First embodiment | 0.42 | 0.5-0.8 μm |
| Second embodiment | 0.46 | 0 |

Further according to the present disclosure, a smaller diameter portion 2c is formed on the outermost circumference 2b of the inner ring 2. The slinger 13, forming the seal 9, is press-fit onto the smaller diameter portion 2c. The shoulder height δ of the smaller diameter portion 2c is set to 0.35 times the diameter "d" of the ball 4 or more (i.e. δ/d≥0.35). Thus, it is possible to provide a wheel bearing apparatus that improves the positioning accuracy of the seal 9 and the sealability of the bearing while assuring the cross-section height of the seal 9.

FIG. 3 shows a modification of the seal 9 of FIG. 2. This seal 16 is formed as a pack seal including an annular sealing plate 17, formed to a configuration having a substantially L-shaped cross-section, and a slinger 13. The sealing plate 17 has a metal core 14 press-fit into the inner circumference of the inner-side end of the outer member 5. A sealing member 18 is integrally adhered to the metal core 14 via vulcanized adhesion.

The sealing member 18 is formed of synthetic rubber such as NBR etc. It includes one pair of side lips 18a, 18b, inclined radially outward, and a grease lip 18c, inclined toward inside of the bearing. The side lips 18a, 18b are adapted to be in sliding contact with a standing-up portion 13b of the slinger 13, via a predetermined axial interference. The grease lip 18c is adapted to be in sliding contact with the cylindrical portion 13a of the slinger 13, via a predetermined radial interference.

According to the present disclosure, a shoulder height H of the inner ring 2 is set within a range of 0.4-0.8 times a diameter "d" of the ball 4 (H/d=0.4-0.8). A shoulder height δ of a smaller diameter portion 2c, formed on the outermost circumference 2b of the inner ring 2, is set to 0.35 times the diameter "d" of the ball 4 or more (i.e. δ/d≥0.35). Accordingly, it is possible to suppress the generation of the edge load of the contact ellipse of the ball 4, improve the positioning accuracy of the seal 16 and improve the sealability of the wheel bearing while assuring the cross-section height of the seal 16 having the pair of side lips 18a, 18b.

Figure 4:
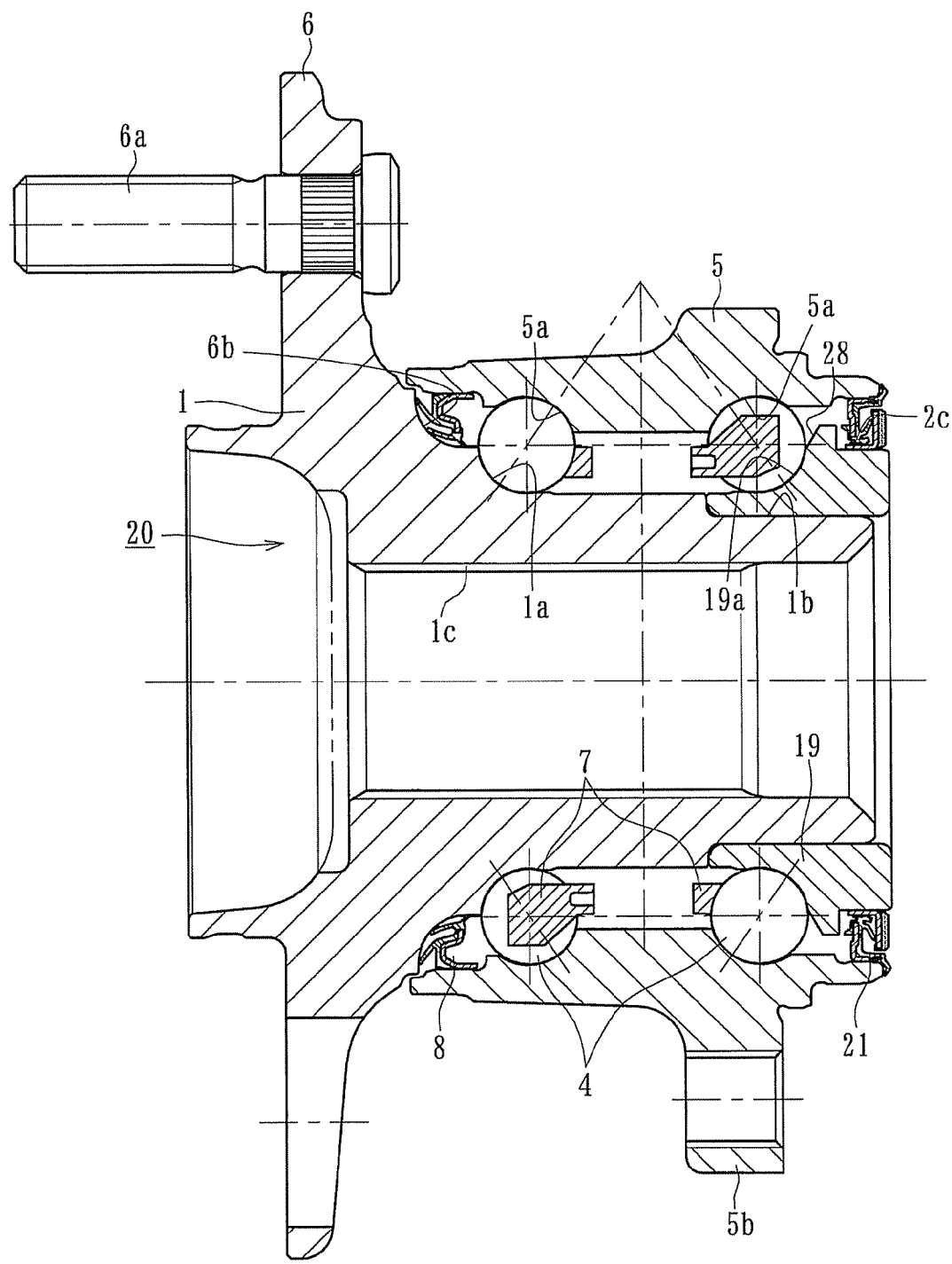
FIG. 4 is a longitudinal section view of a second embodiment of the wheel bearing apparatus.
Figure 7:
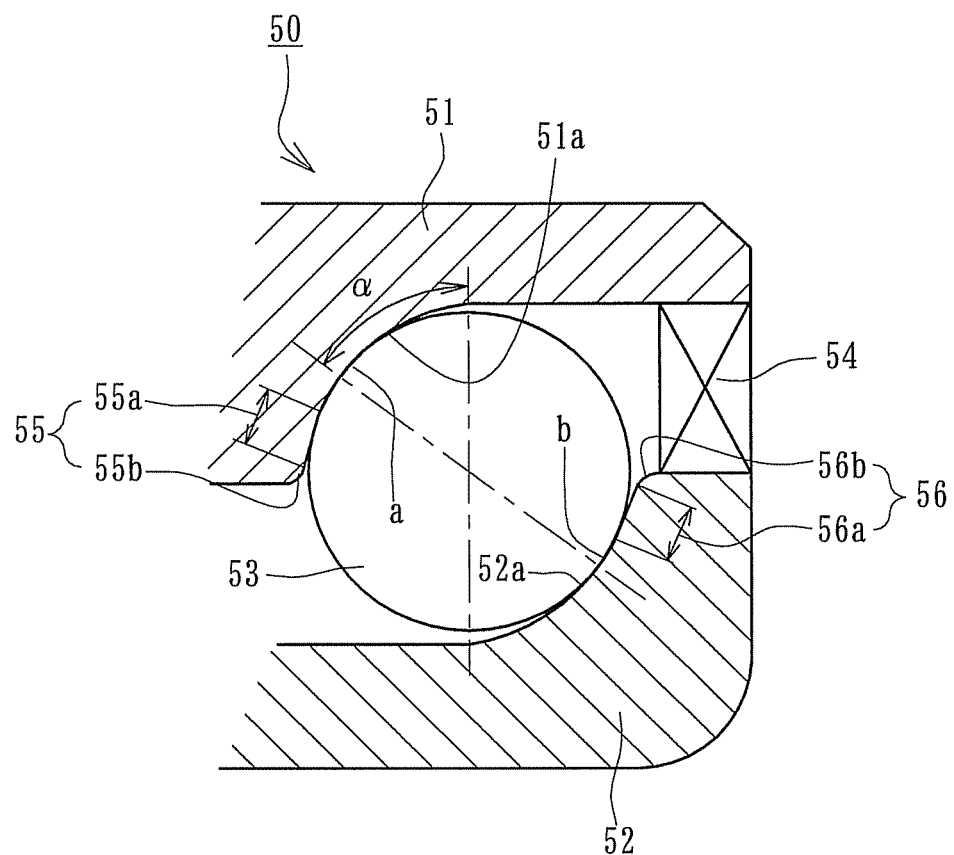
FIG. 7 is a partially enlarged view of a prior art wheel bearing.

FIG. 4 is a longitudinal section view of a second embodiment of the wheel bearing apparatus. FIG. 5 is a partially enlarged view of the wheel bearing apparatus of FIG. 4. FIG. 6 is an explanatory view of a grinding method of the inner ring of FIG. 4. This embodiment is only different in structures of the inner ring and the seal. Thus, the same reference numerals as those used in the first embodiment are used to designate the same structural elements. Thus, their detailed descriptions will be omitted.

This wheel bearing apparatus is a so-called third generation type used for a driving wheel. It includes an inner member 20 with a wheel hub 1 and an inner ring 19 press fit onto the wheel hub 1. An outer member 5 is fit onto the inner member 20 via double row balls 4, 4.

Seals 8, 21 are mounted in end openings of annular space between the outer member 5 and the inner member 20. The seals 8, 21 prevent leakage of grease contained in the bearing and entry of rain water and dust into the bearing.

The inner-side seal 21 is formed as a so-called pack seal. It includes an annular sealing plate 22 with a substantially L-shaped cross-section, and a slinger 13, as shown in an enlarged view of FIG. 5. The sealing plate 22 includes a metal core 14 press-fit into the inner circumference of the inner-side end of the outer member 5. A sealing member 23 is integrally adhered to the metal core 14 via vulcanized adhesion.

A magnetic encoder 24, formed of elastomer such as rubber mingled with magnetic powder such as ferrite, is integrally adhered to the inner-side surface of the standing-up portion 13b of the slinger 13, via vulcanized adhesion. The magnetic encoder 24 has magnetic poles N, S arranged alternately in the circumferential direction and forms a rotary encoder to detect the wheel speed.

The sealing member 23 is formed from synthetic rubber such as NBR etc. The sealing member 23 has a side lip 23a adapted to be in sliding contact with the standing-up portion 13b of the slinger 13. A grease lip 23b and an intermediate lip 23c are adapted to be in sliding contact with the cylindrical portion 13a of the slinger 13. A labyrinth seal 25 is formed in a small radial gap between the outer circumference of the standing-up portion 13b of the slinger 13 and the outer circumference of the sealing member 23. The labyrinth seal 25 prevents rain water or dust from directly splashing on the side lip 23a. Thus, this improves the sealability of the wheel bearing.

In this embodiment, the sealing member 23 is formed with an outer circumferential lip 26 that extends radially outward from the end of the outer circumference of the sealing member 23. The outer circumferential lip 26 is secured to the outer surface of the cylindrical portion 14a of the metal core 14. The outer circumferential lip 26 is adapted to be close contacted with the outer member 5 to improve the sealability of the wheel bearing. In addition, the outer circumferential lip 26 has a substantially L-shaped cross-section. The outer circumferential lip 26 is arranged to fit into a gap between the outer member 5 and a flanged portion 27 of a knuckle K. Furthermore, the diameter of a vertex 26a of the circumferential lip 26 is set at a predetermined value. That is, this predetermined value is determined so that an amount of engagement of the vertex 26a of the lip 26 with the knuckle K exceeds the predetermined value under a condition where there is a predetermined axial gap between a tip 26b and the end face of the outer member 5 during assembly of the knuckle K.

This makes it possible for the tip 26b and the vertex 26a of the outer circumferential lip 26 to abut the end face of the outer member 5 after assembly of the knuckle K and the flange 27 of the knuckle K via a predetermined interference. Accordingly, it is possible to surely prevent pushing out of the circumferential lip 26. Thus, this keeps the sealability between the outer member 5 and the knuckle K. In addition, it is possible to prevent damage of the circumferential lip 26 and prevent entry of muddy water etc. into the gap. This improves the sealability between the outer member 5 and the knuckle K to prevent the generation of rust in the wheel bearing.

According to this embodiment, the shoulder height H of the inner raceway surface 19a of the inner ring 19 is set within a range of within 0.4-0.8 times the diameter "d" of the ball 4 (H/d=0.4-0.8). A tapered surface 28, with an inclined angle θ, is formed over a region from the outermost circumference 19b to the inner raceway surface 19a. A corner A, formed by the tapered surface 28 and the inner raceway surface 19a, is rounded to have a circular arc cross-section. It is smoothly and continuously ground by a formed grinding wheel 29 simultaneously with grinding of the inner raceway surface 19a. The shoulder height H1 of the inner raceway surface 19a from its bottom to the corner A is set within a range of 0.40-0.50 times the diameter "d" of the ball 4 (H1/d=0.40-0.50). This enables the inner raceway surface to resist against indentations even though a large moment load is applied. Thus, this prevents the generation of the edge load and improves the noise level and the life of the wheel bearing. In this embodiment, the effect of suppressing the generation of the edge load while preventing the shoulder overriding of the contact ellipse of the ball 4 is steeply reduced if the inclined angle θ of the tapered surface 28 exceeds 45°. Thus, it is preferable to set the inclined angle θ at 45° or less.

Although it is not illustrated in drawings, the shoulder height of the inner raceway surface 1a of the wheel hub 1 is set within a range of 0.40-0.50 times the diameter "d" of the ball 4 (H/d=0.40-0.50). This increases the strength and rigidity of the wheel hub 1. Thus, this enables the inner raceway surface to resist against indentations even though a large moment load is applied. Thus, this prevents the generation of the edge load and improves the noise level and the life of the wheel bearing.

The wheel bearing of the present disclosure can be applied to the wheel bearing apparatus of first through third generation types irrespective of whether it is used for a driving wheel or a driven wheel.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
an outer member integrally formed with double row outer raceway surfaces on its inner circumference, each outer raceway surface has a circular arc cross-section;
an inner member includes a wheel hub and at least one inner ring, the wheel hub has at its one end an integrally formed wheel mounting flange, an axially cylindrical portion extends from the wheel mounting flange, the inner ring is fit onto the cylindrical portion, the inner member outer circumference includes the inner raceway surfaces, each inner raceway surface has a circular arc cross-section and is adapted to be arranged opposite to one of the double row outer raceway surfaces;
double row rolling elements are freely rollably contained between the outer raceway surfaces and the inner raceway surfaces via cages; and
seals are mounted in openings at both ends of an annular space formed between the outer member and the inner member;
a shoulder height (H) of the inner ring is set within a range of 0.4-0.8 times a diameter (d) of the ball (H/d=0.4-0.8); and
a shoulder height (δ) of a smaller diameter portion formed on the outermost circumference of the inner ring is set to a value δ/d≥0.35 so that the smaller diameter portion diameter is larger than the inner ring diameter at a bottom of the inner raceway surface.

2. The wheel bearing apparatus of claim 1, further comprising a tapered surface with a predetermined inclined angle (θ) formed over a region from the outermost circumference of the inner ring to the inner raceway surface.

3. The wheel bearing apparatus of claim 2, wherein a corner (A) formed by the tapered surface and the inner raceway surface is rounded to have a circular arc cross-section and the corner is smoothly and continuously ground by a formed grinding wheel simultaneously while grinding of the inner raceway surface.

4. The wheel bearing apparatus of claim 3 wherein a shoulder height (H1) of the inner raceway surface from its bottom to the corner (A) is set within a range of 0.40-0.50 times a diameter (d) of the ball (H1/d=0.40-0.50).

5. The wheel bearing apparatus of claim 2, wherein the inclined angle (θ) of the tapered surface is set at 45° or less.

6. The wheel bearing apparatus of claim 1, wherein the seal comprises an annular sealing plate having a substantially L-shaped cross-section, a slinger including a cylindrical portion press-fit onto a smaller diameter portion of the inner ring and a standing-up portion extending radially outward from the cylindrical portion, the stand up portion being substantially coplanar with an end of the inner ring, the slinger is press-fit onto the smaller diameter portion of the inner ring, and the sealing plate is formed as a pack seal comprising a metal core press-fit into the inner circumference of the end of the outer member, and a sealing member integrally adhered to the metal core via vulcanized adhesion, the sealing member contact the outer member and is adapted to be in sliding contact with the slinger such that at least one lip contacts the standing up portion.

7. The wheel bearing apparatus of claim 6, wherein the sealing member comprises a side lip inclined radially outward and adapted to be in sliding contact with the standing-up portion of the slinger via a predetermined axial interference and a grease lip and an intermediate lip bifurcated from each other and adapted to be in sliding contact with the cylindrical portion of the slinger via a predetermined radial interference.

8. The wheel bearing apparatus of claim 6, wherein the sealing member comprises a pair of side lips inclined radially outward and adapted to be in sliding contact with the standing-up portion of the slinger via a predetermined axial interference and a grease lip extending toward the inside of the wheel bearing and adapted to be in sliding contact with the cylindrical portion of the slinger via a predetermined radial interference.

9. The wheel bearing apparatus of claim 6, wherein an outer circumferential lip, extending radially outward and having a substantially L-shaped cross-section, is formed on the outer circumference of the sealing member, the outer circumferential lip is arranged to fit into a gap between the outer member and a flanged portion of a knuckle (K), and the diameter of a vertex of the circumferential lip is set to a predetermined value so that the vertex abuts the flanged portion of the knuckle via a predetermined amount of engagement.

10. The wheel bearing apparatus of claim 1, wherein an inner raceway surface, having a circular arc cross-section to be arranged opposite to one of the double row outer raceway surface, is formed on the outer circumference of the wheel hub, and a shoulder height of the inner raceway surface is within a range of 0.40-0.50 times the diameter (d) of the ball.

* * * * *

UNITED STATES PATENT AND TRADEMARK OFFICE
CERTIFICATE OF CORRECTION

PATENT NO. : 8,905,645 B2
APPLICATION NO. : 13/622539
DATED : December 9, 2014
INVENTOR(S) : Kazuo Komori et al.

It is certified that error appears in the above-identified patent and that said Letters Patent is hereby corrected as shown below:

Title Page, Item 56, References Cited, FOREIGN PATENT DOCUMENTS, page 1, Line 2,
"DE 11 2007 003 1 11/2009" should be -- DE 11 2007 003 129 11/2009 --.

Title Page, Item 56, References Cited, FOREIGN PATENT DOCUMENTS, page 2, Column 2,
Line 2, "JP200111566 04/2009" should be -- JP 2000-111566 04/2009 --.

In The Specification

Column 2
Line 1 "anglea;" should be -- angle $\alpha$ --.

Signed and Sealed this
Twelfth Day of May, 2015

Michelle K. Lee
*Director of the United States Patent and Trademark Office*